United States Patent [19]

Guy

[11] 4,028,936
[45] June 14, 1977

[54] PRESSURE GAUGE

[76] Inventor: Billy Lynn Guy, 240 Shady Lane, Lexington, Ky. 40503

[22] Filed: Sept. 29, 1975

[21] Appl. No.: 617,697

[52] U.S. Cl. .............................. 73/146.8; 73/396; 73/419; 73/420

[51] Int. Cl.² ................... B60C 23/02; G01L 7/16

[58] Field of Search .............. 73/396, 419, 146.3, 73/146.8, 420; 137/625.2, 251, DIG. 1, 517

[56] References Cited

UNITED STATES PATENTS

| | | | |
|---|---|---|---|
| 1,148,361 | 7/1915 | Coxe | 73/396 |
| 2,989,076 | 6/1961 | Rohmann | 137/625.2 |
| 3,216,451 | 11/1965 | Smallpeice | 137/517 |

Primary Examiner—Donald O. Woodiel
Attorney, Agent, or Firm—Frank C. Leach, Jr.

[57] ABSTRACT

A pressure gauge for indicating the fluid pressure at a source of pressure such as a tire, for example, has a chamber formed within a body. When the body is disposed on a tire valve stem, for example, a portion of the body depresses a valve core plunger of the valve stem to enable the pressurized fluid in the tire to flow through a longitudinal passage in the body and past a flap valve, which is an O-ring, into the chamber. This pressurized fluid in the chamber acts on a piston head of a piston, which is slidably disposed in a passage in the body communicating with the chamber, to move the piston against the force of a spring within the body passage. An O-ring is mounted in the piston head to seal the body passage. The O-ring acts as an indicator through cooperation with a scale on the body to indicate the pressure of the fluid in the chamber in the body; this is the same pressure as that in the tire since the tire is communicating with the chamber. When the body is removed from the tire valve stem, the flap valve prevents communication between the longitudinal passage and the chamber to retain the pressurized fluid within the chamber to hold the piston in the position to which it is moved. When the pressure has been read after removal from the tire valve stem, a flap valve, which is part of the same O-ring controlling the communication of the pressurized fluid into the chamber, is opened to vent the chamber to the atmosphere. The O-ring has portions diametrically disposed functioning as the flap valves to control the flow of fluid into and out of the chamber.

39 Claims, 10 Drawing Figures

PRESSURE GAUGE

In obtaining the pressure of a tire, various types of portable gauges have been proposed. In many of these, it is necessary for the pressure to be continuously supplied to the gauge for a reading to be obtained. This has provided difficulty in obtaining gauge readings in relatively inaccessible locations.

Various gauges have previously been suggested for retaining the indicated pressure after the gauge is removed from the tire valve stem, for example. U.S. Pat. No. 1,451,307 to Schweinert et al has previously proposed applying a portable gauge to a tire and having a member responsive to the tire pressure. In the aforesaid Schweinert et al patent, this responsive member moves an indicating member, which is held in the position to which it has been moved by the tire pressure through friction engagement of the member with a fixed portion of the gauge. However, with the gauge of the aforesaid Schweinert et al patent, the indicating member can be accidentally displaced after removal from the tire and before reading. Therefore, an accurate reading is not insured.

Additionally, the friction ring, which holds the indicating member in the position to which it is moved through the responsive member by the tire pressure, cannot have too strong a retaining force against the fixed portion of the gauge. Otherwise, the drag by the friction ring would prevent the motion of the indicating member in response to the pressure in the tire from being truly accurate. Thus, in the aforesaid Schweinert et al patent, the friction ring will not necessarily always hold the indicating member in the position to which it is moved by the tire pressure through the responsive member even if there is no accidental contact with the indicating member.

Furthermore, the indicating member, which cooperates with a scale to indicate the pressure, does not necessarily stop at the position to which it is moved through the responsive member by the tire pressure. This is because the momentum of the indicating member may cause it to continue slightly beyond the position to which it is advanced by the responsive member since the indicating member is not connected to the responsive member.

In each of U.S. Pat. Nos. 1,915,122 and 1,923,776 to Crowley, there is shown a gauge having a similar concept to the gauge of the aforesaid Schweinert et al patent. In each of the aforesaid Crowley patents, the indicating member is moved by the pressure in the tire through the responsive member and retained in this position by a spring or friction engagement. Each of these aforesaid Crowley patents has the same problems as the aforesaid Schweinert et al patent.

The present invention satisfactorily solves the foregoing problems through providing a portable pressure gauge in which a pressure responsive member has the indicator mounted thereon. Thus, the responsive member and the indicator are not separate as in the aforesaid Schweinert et al and Crowley patents so as to avoid the momentum problem.

The responsive member with the indicator is positively held in the position to which it is moved by the pressure in the tire after the gauge is removed from the tire valve stem, for example. The present invention does not require any friction or spring retaining means to hold the responsive member in the desired position nor is there any possiblity of the responsive member being moved to produce an inaccurate reading if it is accidentally contacted after being removed from the tire valve stem and prior to reading the pressure.

The present invention accomplishes this through trapping pressurized fluid from the tire within a chamber in the pressure gauge. Thus, the pressure in the chamber of the gauge is the same as that within the tire. Accordingly, the responsive member, which moves in response to the pressure in the chamber and the tire and is held in this position by the trapped fluid within the chamber in the pressure gauge after the gauge is removed from the tire valve stem, always indicates the true pressure of the chamber and the tire and cannot be accidentally displaced from the position to which it has been moved.

To insure that the pressure is trapped within the chamber, the present invention employs an O-ring as the valve for controlling both the flow of fluid pressure into the chamber of the gauge through a first passage and the flow of fluid pressure from the chamber through a second passage after the pressure has been ascertained in accordance with the position of the responsive member. This O-ring forms a double flap valve with the portions of the O-ring functioning as the double flap valve being diametrically disposed to each other.

An object of this invention is to provide a gauge to determine the fluid pressure at a source of pressure without retaining the gauge in communication with the source of pressure having the fluid pressure to be measured.

Another object of this invention is to provide a gauge to produce an accurate reading of fluid pressure at a source of pressure.

A further object of this invention is to provide a method of ascertaining the fluid pressure at a source of pressure.

Still another object of this invention is to provide a unique double flap valve.

Other objects of this invention will be readily perceived from the following description, claims, and drawings.

This invention relates to a pressure gauge for obtaining the fluid pressure at a source of pressure. The gauge includes a body having a chamber therein with communication between the body chamber and the source of pressure being provided by communicating means to supply pressurized fluid from the source of pressure to the body chamber. The body has movable means movable in response to the pressure of the fluid at the source of pressure through being responsive to the pressure of the fluid in the body chamber and the source of pressure when the communicating means provides communication between the body chamber and the source of pressure. Pressurized fluid is retained within the body chamber by retaining means when communication between the body chamber and the source of pressure is stopped to hold the movable means in the position to which the movable means is moved when the communicating means provides communication between the body chamber and the source of pressure.

This invention also relates to a method for obtaining the fluid pressure at a source of pressure including disposing portable means having a chamber so that pressurized fluid from the source of pressure is received within the chamber in the portable means to move an indicating means to indicate the pressure of the pressurized fluid at the source of pressure. The pressurized fluid is trapped within the chamber in the portable means when pressurized fluid from the source of pressure is no longer received in the chamber so that the trapped liquid holds the indicating means in the position to which it is moved when the chamber receives pressurized fluid from the source of pressure.

This invention further relates to a double flap valve for controlling fluid flow into and out of a chamber. The double flap valve includes a single element having a first portion to control fluid flow into the chamber from a first passage and a second portion to control fluid flow out of the chamber through a second passage. Means limits the motion of each of the first and second portions of the single element from its closed position to its open position.

The attached drawings illustrate a preferred embodiment of the invention, in which.

Figure 1:
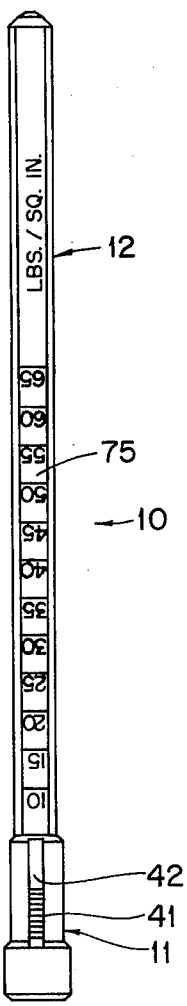
FIG. 1 is a side elevational view of the gauge of the present invention with portions omitted for clarity purposes.
Figure 2:
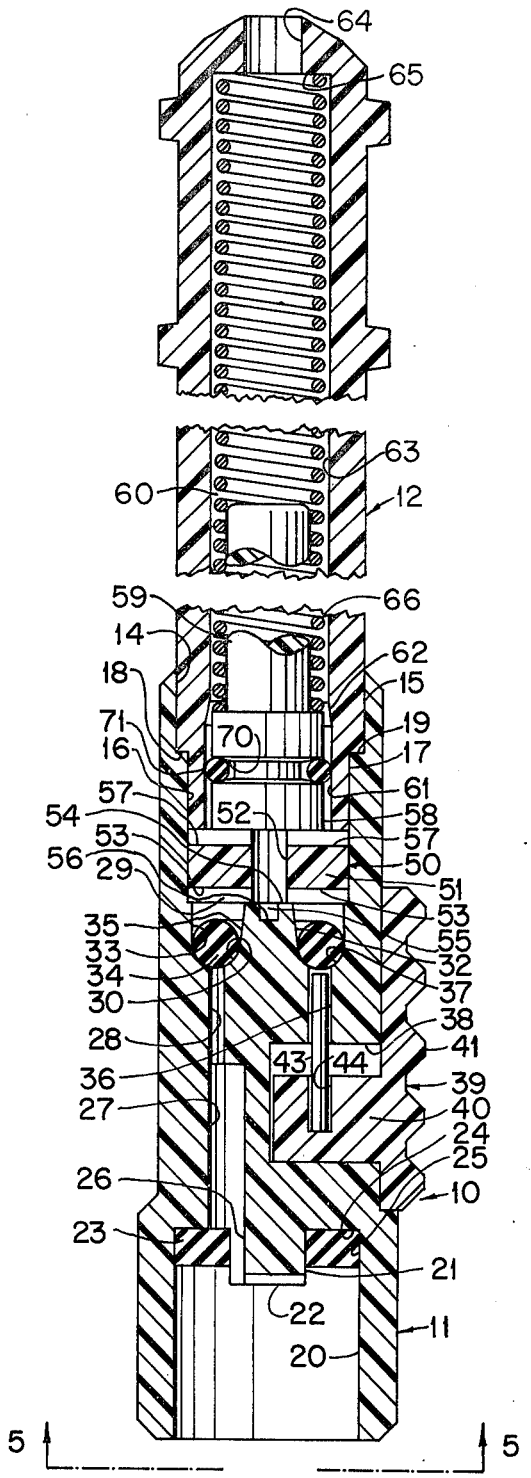
FIG. 2 is an enlarged vertical sectional view of the gauge of the present invention in its inactive position.
Figure 5:
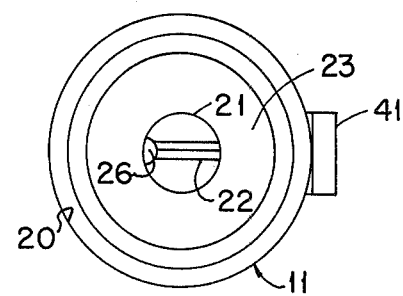
FIG. 5 is an end elevational view of the gauge of FIG. 2 and taken along line 5—5 of FIG. 2.

Referring to the drawings and particularly FIGS. 1 and 2, there is shown an air pressure gauge 10. The gauge 10 includes a first or main cylindrical body 11 and a second cylindrical body 12. The bodies 11 and 12 are secured to each other by suitable means to form a single body. Since the bodies 11 and 12 are formed of a plastic, the bodies 11 and 12 are secured by ultrasonic welding, for example. The bodies 11 and 12 can be formed of a transparent plastic such as Lexan, for example, with the body 11 having a black pigment added during molding thereof so that the body 11 is not transparent whereas the body 12 is transparent.

The body 11 has a first passage 14 at one end to receive a cooperating portion 15 of the body 12 and a second passage 16, which is smaller than the first passage 14, to receive a cooperating reduced portion 17 of the body 12. The body 12 has a shoulder 18 thereon between the portions 15 and 17 for engaging a shoulder 19 on the body 11 between the passages 14 and 16 to limit the movement of the body 12 into the body 11 prior to joining the bodies 11 and 12 to each other.

The opposite end of the body 11 from that to which the body 12 is joined has an enlarged recess or receptacle 20 therein. The body 11 has a central, circular portion 21 extending into the recess or receptacle 20 and has its end terminate in a V-shaped groove 22.

An annular gasket 23 which is formed of a suitable resilient sealing material such as neoprene, for example, is disposed within the recess 20 and bears against an end wall 24 of the recess 20. The gasket 23 surrounds the central, circular portion 21 and bears against an outer wall 25 of the recess 20.

The central, circular portion 21 of the body 11 has a semi-circular slot 26 formed therein to provide communication between the recess 20 and a longitudinal passage 27 of circular cross section within the body 11. The longitudinal passage 27 has a continuation passage 28 of circular cross section and smaller diameter communicating with a circular cylindrical chamber 29, which is formed between the bodies 11 and 12 and within the body 11.

Figure 6:
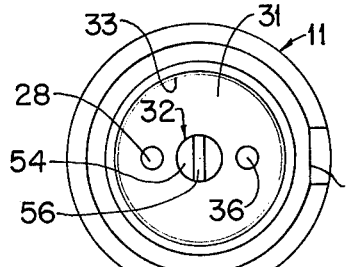
FIG. 6 is an end elevational view of the main body of the gauge.

The end of the passage 28 terminates in a circular valve seat 30, which is within the chamber 29. The seat 30 is formed by the bottom of an annular recess 31 (see FIG. 6) within the body 11 between a guide portion 32 of the body 11 and an inner surface 33 of the body 11.

The recess 31 receives resilient means such as an O-ring 34 (see FIGS. 2-4), for example. A portion of the O-ring 34 engages the seat 30 to control communication between the passage 28 and the chamber 29 so that the engaging portion of the O-ring 34 functions as a flap valve to control flow from the passage 28 to the chamber 29.

The guide portion 32 has its guide surface 35 converging towards its free end. Accordingly, whenever pressure in the passage 28 acts on the portion of the O-ring 34 engaging the valve seat 30, this portion of the O-ring 34 moves away from the valve seat 30 without any restrictions on its movement because of the converging guide surface 35 of the guide portion 32.

The chamber 29 has a second passage 36 extending from a circular valve seat 37, which also is formed by the bottom of the annular recess 31, in the chamber 29 to exterior of the body 11 to provide communication from the chamber 29 to the atmosphere. The passage 36 communicates with a recess or receptacle 38 in the body 11 with the recess or receptacle 38 communicating with the atmosphere.

An actuator 39 has its body 40 disposed within the recess 38. A knob 41 of the actuator 39 is disposed on a longitudinal flat 42 (see FIGS. 1 and 6) on the outer surface of the body 11.

Figure 4:
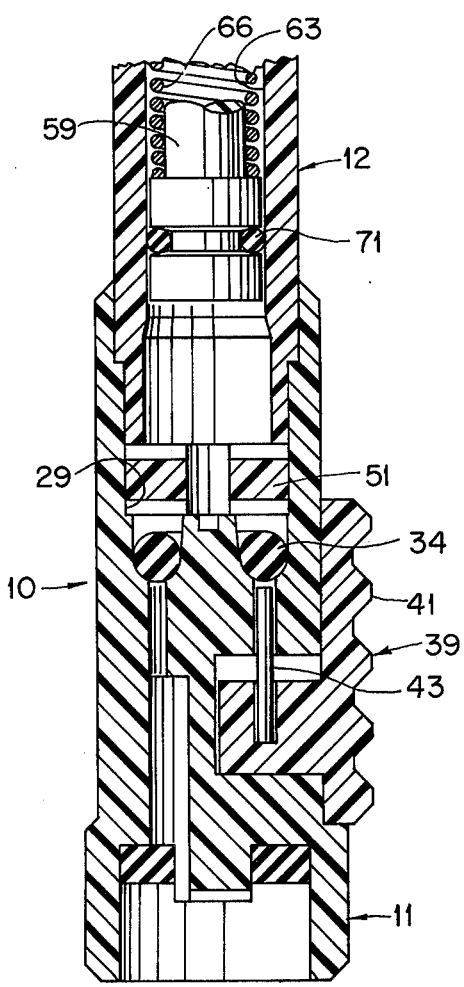
FIG. 4 is an enlarged fragmentary vertical sectional view of a portion of the gauge after it has received the pressurized fluid from the tire and been removed from the tire valve stem.
Figure 3:
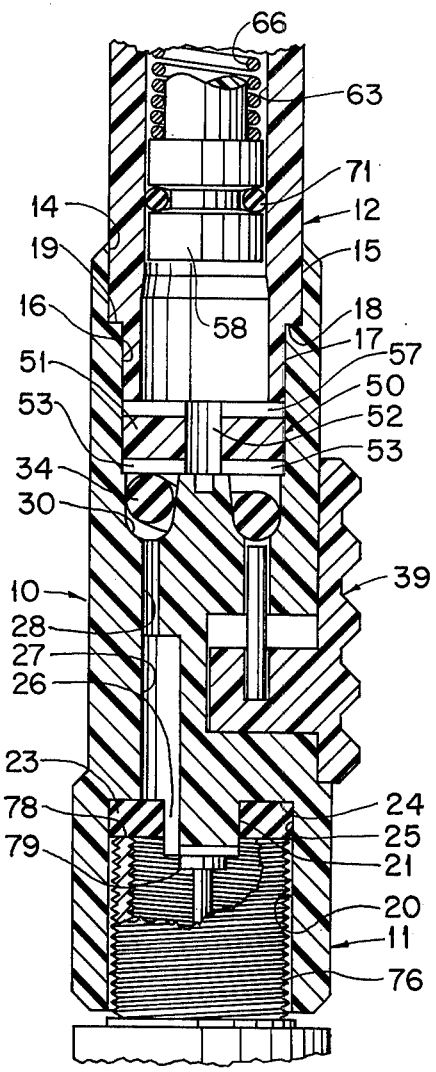
FIG. 3 is an enlarged fragmentary vertical sectional view of a portion of the gauge of FIG. 2 mounted on a tire valve stem with the valve of the stem being open to supply pressurized fluid to the gauge from a tire having the tire valve stem.

The body 40 of the actuator 39 has a pin 43 (see FIGS. 2-4) slidably disposed within a recess 44 in the body 40. The pin 43 extends into the passage 36 in the body 11 as shown in FIGS. 2-4. In this position, the pin 43 does not engage the portion of the O-ring 34 engaging the valve seat 37 and functioning as a flap valve but is slightly spaced therefrom. However, since the body 40 is shorter in length than the length of the recess 38, motion of the actuator 39 through moving the knob 41 along the longitudinal flat 42 causes the pin 43 to contact the portion of the O-ring 34 engaging the seat 37 to remove this portion of the O-ring 34 away from the seat 37 and allow communication from the chamber 29 to the atmosphere through the passage 36.

The pin 43 is slightly smaller in diameter than the passage 36 so that flow can occur therebetween. For example, the pin 43 could have a diameter of 0.032 inch when the passage 36 has a diameter of 0.035 inch.

The body 11 has a retainer 50 disposed within the chamber 29 to limit the motion of either of the portions of the O-ring 34 functioning as flap valves away from the valve seat 30 or 37 while still permitting flow past the O-ring 34. The retainer 50 includes a body 51 of circular cross section having a central passage 52 of circular cross section extending therethrough. The outer wall of the body 51 engages the inner surface of the portion of the body 11 defining the chamber 29.

Figure 7:
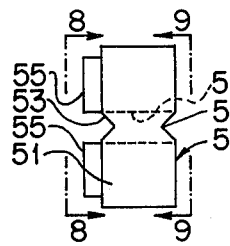
FIG. 7 is a top plan view of a retainer used in the gauge of the present invention.
Figure 8:
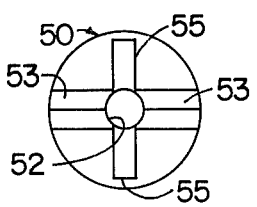
FIG. 8 is a side elevational view of the retainer of FIG. 7 and taken along line 8—8 of FIG. 7.

On its end adjacent to the O-ring 34, the body 51 has a V-shaped groove 53 extending from each side of the passage 52 as shown in FIG. 8. The end of the body 51 abuts an end surface 54 (see FIG. 2) of the guide portion 32. The end of the body 51 has a pair of tabs 55 (see FIGS. 7 and 8) extending therefrom on opposite sides of the passage 52.

Each of the tabs 55 is disposed 90° from each of the V-shaped grooves 53. A portion of each of the tabs 55 fits within a slot 56 (see FIGS. 2 and 6) in the end surface 54 of the guide portion 32.

This arrangement disposes the retainer body 51 so that the end of the body 51 limits the motion of either the portion of the O-ring 34 engaging the valve seat 30 when it moves away from the seat 30 or the portion of the O-ring 34 engaging the valve seat 37 when it moves away from the seat 37. The tabs 55 extend beyond the guide portion 32 to almost the outer wall of the body 51 to engage the portions of the O-ring 34 which are 90° away from each of the portions of the O-ring 34 functioning as flap valves for engaging the valve seats 30 and 37.

This arrangement insures that only the portion of the O-ring 34, which is engaging the valve seat 30, for example, moves when fluid pressure acts on the O-ring 34 through the passage 28. Similarly, only the portion of the O-ring 34 engaging the valve seat 37 moves when the pin 43 engages the O-ring 34 to move it away from the seat 37. Therefore, the retainer 50 limits the motion of each of the flap valve portions of the O-ring 34 and prevents motion of the remainder of the O-ring 34.

Furthermore, when the portion of the O-ring 34 engaging the valve seat 30 is moved away from the seat 30 to engage the end of the body 51 of the retainer 50 as shown in FIG. 3, one of the V-shaped grooves 53 in the end of the body 51 still provides communication from the passage 28 through the V-shaped groove 53 to the central passage 52 in the retainer body 51. The other of the V-shaped grooves 53 provides similar communication when the portion of the O-ring 34 engaging the valve seat 37 is moved to its open position by the pin 43.

Figure 9:
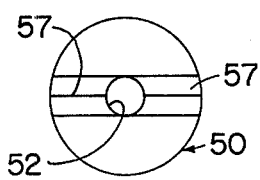
FIG. 9 is a side elevational view of the retainer of FIG. 7 and taken along line 9—9 of FIG. 7.

The body 51 has a V-shaped groove 57 (see FIG. 9) formed therein on each side of the passage 52 at its end engaging the end of the body 12. Thus, the diametrically disposed V-shaped grooves 57 extending from the passage 52 enable any fluid flowing through the passage 52 to be dispersed throughout the maximum diameter of the chamber 29. As a result, the fluid acts across the end surface of a head 58 of a piston 59 since the diameter of the piston head 58 is less than the diameter of the chamber 29.

The piston 59 is slidably disposed within a longitudinal passage 60 of circular cross section in the second body 12. The passage 60, which extends throughout the length of the body 12, includes a first portion 61, a second portion 62, and a third portion 63. The first portion 61 has the largest diameter while the third portion 63 has the smallest diameter. The second portion 62 is tapered to form a smooth change in cross sectional area of the passage 60 from the larger first portion 61 to the smaller third portion 63.

The end of the portion 63 of the passage 60 has an opening 64 of reduced diameter in comparison with the portion 63. The opening 64 is formed by an annular flange 65 at the end of the body 12.

A spring 66 is disposed in surrounding relation to the piston 59 and has one end bearing against the annular flange 65 of the body 12 and its other end contacting a surface of the piston head 58. Thus, the spring 66 continuously urges the piston head 58 of the piston 59 against the end of the retainer body 51 as shown in FIG. 2.

Figure 10:
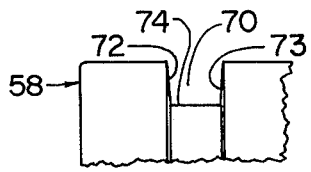
FIG. 10 is an enlarged fragmentary plan view of a portion of the head of the piston of the gauge of the present invention.

The piston head 58 has a groove 70 formed therein to receive an O-ring 71. As shown in FIG. 10, the groove 70 is formed with its side walls 72 and 73 diverging away from its bottom wall 74. This divergence is preferably 2° so that the angle of each of the side walls 72 and 73 of the groove 70 to the bottom wall 74 is 92° rather than 90°.

Accordingly, when there is no pressurized fluid acting on the piston head 58, the piston head 58 is disposed in the position of FIG. 2 wherein the O-ring 71 extends substantially beyond the outer wall of the piston head 58 to engage the wall of the first and largest portion 61 of the passage 60. However, when pressurized fluid is acting on the piston head 58, as shown in FIGS. 3 and 4, the O-ring 71 moves into the groove 70 while still having a seal with the portion 63 of the passage 60 to prevent fluid flow therebetween.

The portion 62 of the passage 60 provides a smooth forcing of the O-ring 71 into the groove 70 as the O-ring 71 moves from the portion 61 to the portion 63. The angled relation of the side walls 72 and 73 of the groove 70 enables the O-ring 71 to be easily pushed into the groove 70 while forming a seal with the wall of the passage 60 and the side walls 72 and 73 of the groove 70. The O-ring 71 does not seal the bottom wall 74 of the groove 70 although the O-ring 71 may engage the bottom wall 74.

When the piston 59 moves in response to pressurized fluid in the chamber 29, the O-ring 71 functions as an indicator to indicate the pressure of the fluid in the chamber 29. The O-ring 71 cooperates with a scale 75 (see FIG. 1) on the transparent body 12. Since the body 12 is transparent, the O-ring 71 is visible through the body 12 so that its location relative to indicia on the scale 75 can be ascertained. The piston 59, the spring 66, and the O-ring 71 have been omitted from FIG. 1 for clarity purposes.

Considering the operation of the pressure gauge 10, the gauge 10 is disposed over the end of a tire valve stem 76 (see FIG. 3) of a tire, which is a source of pressure, through the stem 76 being received in the recess 20 of the body 11. When the gauge 10 is moved down over the stem 76 until the stem 76 has its end 78 engaging the gasket 23, the central, circular portion 21 engages a valve core plunger 79 within the stem 76 to open the valve within the stem 76. The V-shaped groove 22 of the central, circular portion 21 insures that flow of pressurized fluid from the tire is not blocked.

The opening of the valve within the stem 76 enables the pressurized fluid from the tire, which is an enclosed chamber, to flow therefrom into the recess 20 of the body 11. The pressurized fluid from the recess 20 through the slot 26, the passage 27, and the passage 28 to act against the portion of the O-ring 34 engaging the valve seat 30 and functioning as a flap valve. This moves the valve seat engaging portion of the O-ring 34 from the position of FIG. 2 to the position of FIG. 3 where the valve seat engaging portion of the O-ring 34 abuts the end of the retainer body 51 adjacent one of the V-shaped grooves 53 in the body 51 to enable the pressurized fluid to flow from the passage 28 into the chamber 29.

As the fluid flows through the V-shaped groove 53 in the retainer body 51, it enters the central passage 52 in the retainer body 51 and then flows therefrom to act against the piston head 58. The V-shaped grooves 57 in the retainer body 51 aid in dispersing the pressurized fluid to act on diametrically disposed portions of the piston head 58 as well as the central portion thereof. Because of the O-ring 71, the pressurized fluid in the chamber 29 and the tire moves the piston head 58 against the force of the spring 66 to the position shown in FIG. 3.

When the pressure gauge 10 is removed from the stem 76 after having received pressurized fluid therefrom, the pressure within the chamber 29 moves the valve seat engaging portion of the O-ring 34, which has previously been moved away from the valve seat 30, back into engagement with the valve seat 30 to block the escape of the pressurized fluid from the chamber 29. This occurs no later than when the pressure gauge 10 is removed from the stem 76 so that the pressurized fluid is no longer flowing from the tire. Any leakage from the chamber 29, prior to closing of the passage 28 by the O-ring 34, is very minute and does not have an effect on the reading of the fluid pressure by the cooperation of the O-ring 71 relative to the scale 75.

It should be understood that the resiliency of the O-ring 34 causes the valve seat engaging portion to engage the valve seat 30 as soon as the pressurized fluid ceases to flow to the chamber 29, and this occurs when the pressure in the chamber 29 is equal to the pressure in the tire. However, the blocking of the escape of the pressurized fluid from the chamber 29 may not occur until there is no longer pressurized fluid in the passage 28.

Then, the gauge 10 can be moved to any location while the trapped pressurized fluid within the chamber 29 holds the piston 59 in the position to which it has been moved by the pressure in the tire and the chamber 29 when the gauge 10 was mounted on the stem 76. This is shown in FIG. 4. Therefore, easy reading of the pressure in the tire is obtained by the location of the O-ring 71, which is held by the pressure in the chamber 29, relative to the indicia on the scale 75.

After the reading has been obtained, the knob 41 of the actuator 39 is advanced along the longitudinal flat 42 to cause the pin 43 to move the other of the valve seat engaging portions of the O-ring 34 away from the valve seat 37 and into engagement with the end of the retainer body 51. This allows venting of the pressurized fluid trapped within the chamber 29 to the atmosphere.

As this venting occurs, the spring 66 returns the piston 59 to the position of FIG. 2. Because the O-ring 71 does not have a tight fit with the larger portion 61 of the passage 60, some of the pressurized fluid from the chamber 29 also can escape through the passage 60 and the opening 64 in the end of the body 12 to the atmosphere.

After the piston 59 has returned to the position of FIG. 2, the knob 41 of the actuator 39 is returned to the position of FIGS. 1 to 4. This results in the O-ring 34 having its valve seat engaging portion again engage the valve seat 37. Thus, the gauge 10 has its parts in the position of FIG. 2.

It should be understood that the length of the piston 59 is substantially less than the length of the body 12 so that the piston 59 always remains within the passage 60 in the body 12. The piston 59 is larger in diameter than the diameter of the opening 64 in the body 12.

While the present invention has shown and described the pressure gauge 10 as being utilized with the tire, which is an enclosed chamber, it should be understood that the pressure gauge 10 could be employed to ascertain the pressure of any fluid at any source of pressure so that the source of pressure can be other than an enclosed chamber. It is only necessary that there be some means by which a valve can be opened to enable the pressurized fluid at the source of pressure to be transmitted or conveyed to the chamber 29 in the body 11 and trapped therein.

While the present invention has shown and described the O-ring 34 as controlling the flow of fluid from the passage 28 to the chamber 29 and from the chamber 29 to the passage 36, it should be understood that any other suitable resilient means could be utilized. Thus, any continuous resilient member would be satisfactory. Furthermore, rubber balls could be utilized with each of the valve seats 30 and 37 rather than the O-ring 34 if desired. It would be necessary to limit the motion of each of the rubber balls.

While the present invention has shown and described the gauge 10 as being mounted over the valve stem 76, it should be understood that the inner wall or surface of the recess 20 of the body 11 could have threads thereon for cooperation with threads on the tire stem 76 if desired. This would be necessary if the source of pressure had a very high pressure such as 400 p.s.i., for example, rather than the pressure of a tire.

An advantage of this invention is that fluid pressure from a relatively inaccessible location can be obtained. Another advantage of this invention is that a relatively inexpensive double flap valve is provided.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A pressure gauge for obtaining the fluid pressure at a source of pressure including:

a body;

said body having a chamber therein;

communicating means to provide communication between said body chamber and the source of pressure to supply pressurized fluid from the source of pressure to said body chamber;

retaining means to retain the pressurized fluid within said body chamber when communication between said body chamber and the source of pressure is stopped;

said communicating means including:

means in said body to open a valve controlling communication to the source of pressure;

and fluid conveying means in said body to convey fluid from the source of pressure to said body chamber;

said fluid conveying means including:
a receptacle in said body to receive the pressurized fluid from the source of pressure;
and passage means in said body connecting said receptacle and said body chamber;
said retaining means including means to block communication between said passage means and said body chamber when fluid is not being supplied to said passage means from the source of pressure, said blocking means comprising a valve;
release means to release the pressurized fluid from said body chamber;
said release means including:
a passage in said body, said passage extending from said body chamber to exterior of said body;
closing means to close said passage, said closing means being disposed within said body chamber and comprising a valve;
and means to activate said closing means;
a first valve seat disposed within said body chamber and surrounding the end of said passage means of said fluid conveying means, said valve of said retaining means engaging said first valve seat to block communication between said passage means and said body chamber when fluid is not being supplied to said passage means from the source of pressure;
a second valve seat disposed within said body chamber and surrounding the end of said passage of said release means, said valve of said release means engaging said second valve seat to close said passage of said release means;
resilient means within said body chamber, said resilient means comprising said valve of said retaining means and said valve of said release means;
and means to indicate the pressure of the fluid within said body chamber.

2. The gauge according to claim 1 in which said resilient means comprises a single element having a first portion engaging said first valve seat and a second portion engaging said second valve seat.

3. The gauge according to claim 2 in which said first and second valve seats are diametrically disposed.

4. The gauge according to claim 3 including means within said body chamber to limit motion of each of said first and second portions of said single element.

5. The gauge according to claim 1 in which:
said body has movable means movable in response to the pressure of the fluid at the source of pressure through being responsive to the pressure of the fluid in said body chamber and the source of pressure when said communicating means provides communication between said body chamber and the source of pressure;
said movable means being held by the pressurized fluid within said body chamber in the position to which said movable means is moved when said communicating means provides communication between said body chamber and the source of pressure;
and said pressure indicating means includes means to indicate the pressure of the fluid within said body chamber in accordance with the position of said movable means in said body.

6. The gauge according to claim 5 in which:
said resilient means comprises a single element having a first portion engaging said first valve seat and a second portion engaging said second valve seat;
said first and second valve seats being diametrically disposed;
means within said body chamber to limit motion of each of said first and second portions of said single element;
said movable means includes responsive means disposed in said body and responsive to the fluid pressure in said body chamber;
and said pressure indicating means includes at least one of said responsive means and said body having means to indicate the pressure of the fluid within said body chamber in accordance with the position of said responsive means in said body.

7. The gauge according to claim 6 in which:
said body has a passage extending from said body chamber;
said responsive means is disposed in said extending passage;
and said responsive means includes sealing means to seal said extending passage when said body chamber has pressurized fluid therein.

8. The gauge according to claim 7 in which said responsive means includes:
piston means slidably disposed in said extending passage;
and means to continuously urge said piston means toward said body chamber.

9. The gauge according to claim 5 in which:
said body is a longitudinally extending body;
said body chamber is disposed intermediate the ends of said longitudinally extending body;
and said movable means is movable longitudinally in said body away from said body chamber in response to the pressure of the fluid at the source of pressure.

10. The gauge according to claim 5 in which:
said body chamber is an expansible chamber;
and said movable means forms a wall of said expansible chamber.

11. The gauge according to claim 5 in which:
said movable means is slidably movable in said body;
and means in said body continuously acts on said slidably movable means to oppose movement of said slidably movable means in response to the pressure of the fluid in said body chamber.

12. The gauge according to claim 1 in which said first and second valve seats are diametrically disposed.

13. The gauge according to claim 1 in which said resilient means comprises an annular member having a first portion engaging said first valve seat and a second portion engaging said second valve seat.

14. The gauge according to claim 13 in which said first and second valve seats are diametrically disposed.

15. The gauge according to claim 14 including means within said body chamber to limit motion of each of said first and second portions of said annular member.

16. A pressure gauge for obtaining the fluid pressure at a source of pressure including:
a body;
said body having a chamber therein;
communicating means to provide communication between said body chamber and the source of pressure to supply pressurized fluid from the source of pressure to said body chamber;
retaining means to retain the pressurized fluid within said body chamber when communication between said body chamber and the source of pressure is stopped;

said communicating means including:
   means in said body to open a valve controlling communication to the source of pressure;
   and fluid conveying means in said body to convey fluid from the source of pressure to said body chamber;
   said fluid conveying means including:
      a receptacle in said body to receive the pressurized fluid from the source of pressure;
      and passage means in said body connecting said receptacle and said body chamber;
   said retaining means including means to block communication between said passage means and said body chamber when fluid is not being supplied to said passage means from the source of pressure, said blocking means comprising a valve;
   release means to release the pressurized fluid from said body chamber;
   said release means including:
      a passage in said body, said passage extending from said body chamber to exterior of said body;
      closing means to close said passage, said closing means being disposed within said body chamber and comprising a valve;
      and means to activate said closing means;
   a first valve seat disposed within said body chamber and surrounding the end of said passage means of said fluid conveying means, said valve of said retaining means engaging said first valve seat to block communication between said passage means and said body chamber when fluid is not being supplied to said passage means from the source of pressure;
   a second valve seat disposed within said body chamber and surrounding the end of said passage of said release means, said valve of said release means engaging said second valve seat to close said passage of said release means;
   and means to indicate the pressure of the fluid within said body chamber.

17. The gauge according to claim 16 in which:
   said body has movable means movable in response to the pressure of the fluid at the source of pressure through being responsive to the pressure of the fluid in said body chamber and the source of pressure when said communicating means provides communication between said body chamber and the source of pressure;
   said movable means being held by the pressurized fluid within said body chamber in the position to which said movable means is moved when said communicating means provides communication between said body chamber and the source of pressure;
   and said pressure indicating means includes means to indicate the pressure of the fluid within said body chamber in accordance with the position of said movable means in said body.

18. The gauge according to claim 17 in which:
   said body is a longitudinally extending body;
   said body chamber is disposed intermediate the ends of said longitudinally extending body;
   and said movable means is movable longitudinally in said body away from said body chamber in response to the pressure of the fluid at the source of pressure.

19. The gauge according to claim 17 in which:
   said body chamber is an expansible chamber;
   and said movable means forms a wall of said expansible chamber.

20. The gauge according to claim 17 in which:
   said movable means is slidably movable in said body;
   and means in said body continuously acts on said slidably movable means to oppose movement of said slidably movable means in response to the pressure of the fluid in said body chamber.

21. The gauge according to claim 16 including means to limit the motion of said valve of said retaining means away from said first valve seat and the motion of said valve of said release means away from said second valve seat.

22. A pressure gauge for obtaining the fluid pressure at a source of pressure including:
   a body;
   said body having a chamber therein;
   said body having first passage means to provide communication between said body chamber and the source of pressure to supply pressurized fluid from the source of pressure to said body chamber;
   said body having second passage means to provide communication between said body chamber and the exterior of said body;
   a single member within said body chamber to close each of said first and second passage means;
   said single member closing said first passage means to retain the pressurized fluid within said body chamber when communication between said body chamber and the source of pressure is stopped;
   means to indicate the pressure of the fluid within said body chamber;
   and means to move said single member to open said second passage means to release the pressurized fluid from said body chamber.

23. The gauge according to claim 22 in which:
   said body has movable means in response to the pressure of the fluid at the source of pressure through being responsive to the pressure of the fluid in said body chamber and the source of pressure when said first passage means provides communication between said body chamber and the source of pressure;
   said movable means being held by the pressurized fluid within said body chamber in the position to which said movable means is moved when said first passage means provides communication between said body chamber and the source of pressure;
   and said pressure indicating means includes means to indicate the pressure of the fluid within said body chamber in accordance with the position of said movable means in said body.

24. The gauge according to claim 23 in which:
   said body is a longitudinally extending body;
   said body chamber is disposed intermediate the ends of said longitudinally extending body;
   and said movable means is movable longitudinally in said body away from said body chamber in response to the pressure of the fluid at the source of pressure.

25. The gauge according to claim 23 in which:
   said body chamber is an expansible chamber;
   and said movable means forms a wall of said expansible chamber.

26. The gauge according to claim 23 in which:
   said movable means is slidably movable in said body;
   and means in said body continuously acts on said slidably movable means to oppose movement of said slidably movable means in response to the pressure of the fluid in said body chamber.

27. The gauge according to claim 22 including:
a first valve seat disposed within said body chamber and surrounding the end of said first passage means;
a second valve seat disposed within said body chamber and surrounding the end of said second passage means;
and said single member engaging each of said first and second valve seats when closing each of said first and second passage means.

28. The gauge according to claim 27 in which said single member comprises an annular member having a first portion engaging said first valve seat and a second portion engaging said second valve seat.

29. The gauge according to claim 28 in which said single member is a resilient member.

30. A pressure gauge for obtaining the fluid pressure at a source of pressure including:
a body;
said body having a chamber therein;
communicating means to provide communication between said body chamber and the source of pressure to supply pressurized fluid from the source of pressure to said body chamber;
said body having movable means movable in said body in response to the pressure of the fluid at the source of pressure through being responsive to the pressure of the fluid in said body chamber and the source of pressure when said communicating means provides communication between said body chamber and the source of pressure;
retaining means within said body chamber to retain the pressurized fluid within said body chamber when communication between said body chamber and the source of pressure is stopped to hold said movable means in the position to which said movable means is moved when said communicating means provides communication between said body chamber and the source of pressure;
said movable means including responsive means disposed in said body and responsive to the fluid pressure in said body chamber;
at least one of said responsive means and said body has means to indicate the pressure of the fluid within said body chamber in accordance with the position of said responsive means in said body;
said body has a passage extending from said body chamber;
said responsive means is disposed in said extending passage;
said responsive means includes sealing means to seal said extending passage when said body chamber has pressurized fluid therein;
and means to continuously urge said responsive means to a position in which said sealing means of said responsive means is not fully effective so that said sealing means is moved to its position in which it is not fully effective when said body chamber does not have pressurized fluid therein.

31. A pressure gauge for obtaining the fluid pressure at a source of pressure including:
a body;
said body having a chamber therein;
said body having first passage means to provide communication between said body chamber and the source of pressure to supply pressurized fluid from the source of pressure to said body chamber;
said body having second passage means to provide communication between said body chamber and the exterior of said body;
resilient means within said body chamber to close each of said first and second passage means;
said resilient means closing said first passage means to retain the pressurized fluid within said body chamber when communication between said body chamber and the source of pressure is stopped;
means to indicate the pressure of the fluid within said body chamber;
and means to move said resilient means to open said second passage means to release the pressurized fluid from said body chamber.

32. The gauge according to claim 31 in which:
said body has movable means movable in response to the pressure of the fluid at the source of pressure through being responsive to the pressure of the fluid in said body chamber and the source of pressure when said first passage means provides communication between said body chamber and the source of pressure;
said movable means being held by the pressurized fluid within said body chamber in the position to which said movable means is moved when said first passage means provides communication between said body chamber and the source of pressure;
and said pressure indicating means includes means to indicate the pressure of the fluid within said body chamber in accordance with the position of said movable means in said body.

33. The gauge according to claim 32 in which:
said body is a longitudinally extending body;
said body chamber is disposed intermediate the ends of said longitudinally extending body;
and said movable means is movable longitudinally in said body away from said body chamber in response to the pressure of the fluid at the source of pressure.

34. The gauge according to claim 32 in which:
said body chamber is an expansible chamber;
and said movable means forms a wall of said expansible chamber.

35. The gauge according to claim 32 in which:
said movable means is slidably movable in said body;
and means in said body continuously acts on said slidably movable means to oppose movement of said slidably movable means in response to the pressure of the fluid in said body chamber.

36. A double flap valve for controlling fluid flow into and out of a chamber including:
a single annular element having a first portion for engaging a valve seat surrounding a first passage to control fluid flow into the chamber from the first passage and a second portion for engaging a valve seat surrounding a second passage to control fluid flow out of the chamber through the second passage;
and means to limit the motion of each of said first and second portions of said single element from its closed position to its open position.

37. The valve according to claim 36 in which said single element is a continuous resilient member.

38. The valve according to claim 37 in which said continuous resilient member is an O-ring.

39. The valve according to claim 36 in which said first and second portions of said single element are diametrically disposed.

* * * * *

UNITED STATES PATENT OFFICE
CERTIFICATE OF CORRECTION

Patent No. 4,028,936　　　　　　　　　Dated　June 14, 1977

Inventor(s) Billy Lynn Guy

It is certified that error appears in the above-identified patent and that said Letters Patent are hereby corrected as shown below:

Column 6, line 67, after "fluid" insert -- flows --.

Signed and Sealed this

Eighth Day of November 1977

[SEAL]

Attest:

RUTH C. MASON　　　　　　　　LUTRELLE F. PARKER
Attesting Officer　　　Acting Commissioner of Patents and Trademarks